United States Patent
Boyle et al.

(10) Patent No.: US 9,124,306 B2
(45) Date of Patent: Sep. 1, 2015

(54) WIRELESS DATA TRANSMISSION VIA INDUCTIVE COUPLING USING DI/DT AS THE MAGNETIC MODULATION SCHEME WITHOUT HYSTERESIS

(71) Applicants: Greg Robert Boyle, Camarillo, CA (US); William Claude Robertson, Houston, TX (US); Robert A. Johnigan, Houston, TX (US)

(72) Inventors: Greg Robert Boyle, Camarillo, CA (US); William Claude Robertson, Houston, TX (US); Robert A. Johnigan, Houston, TX (US)

(73) Assignee: Oceaneering International, Inc., Houston, TX (US)

( * ) Notice: Subject to any disclaimer, the term of this patent is extended or adjusted under 35 U.S.C. 154(b) by 80 days.

(21) Appl. No.: 14/095,748

(22) Filed: Dec. 3, 2013

(65) Prior Publication Data

US 2014/0162551 A1 Jun. 12, 2014

Related U.S. Application Data

(60) Provisional application No. 61/736,425, filed on Dec. 12, 2012.

(51) Int. Cl.
*H04B 5/00* (2006.01)
(52) U.S. Cl.
CPC ............ *H04B 5/0031* (2013.01); *H04B 5/0093* (2013.01)

(58) Field of Classification Search
CPC ............................ H04B 5/0031; H04B 5/0093
See application file for complete search history.

(56) References Cited

U.S. PATENT DOCUMENTS

| 5,293,400 A | 3/1994 | Monod et al. |
| 2004/0189486 A1* | 9/2004 | Dodge et al. ............... 340/854.9 |
| 2007/0184704 A1 | 8/2007 | Blaak et al. |
| 2009/0102590 A1 | 4/2009 | Rhodes et al. |
| 2010/0085839 A1 | 4/2010 | Rhodes et al. |
| 2010/0156193 A1 | 6/2010 | Rhodes et al. |
| 2012/0175969 A1 | 7/2012 | Maughan et al. |
| 2014/0015338 A1 | 1/2014 | Yoshino et al. |

FOREIGN PATENT DOCUMENTS

WO 2009127330 A1 10/2009

* cited by examiner

*Primary Examiner* — David Bilodeau
(74) *Attorney, Agent, or Firm* — Maze IP Law, PC

(57) ABSTRACT

The disclosed couplers operate in a "near field" mode, meaning energy, whether used to transmit data or power, is transferred through magnetic induction using a ∂i/∂t circuit (meaning a change in current over a change in time), such as by using inductive transmission and receive coils in which resistors and/or other components such as diodes are placed into series and/or in parallel with the coils and used to control the shape of the pulse, e.g. its voltage and/or frequency. In embodiments, no hysteresis circuit is required for data transmission.

35 Claims, 7 Drawing Sheets

WIRELESS DATA TRANSMISSION VIA INDUCTIVE COUPLING USING DI/DT AS THE MAGNETIC MODULATION SCHEME WITHOUT HYSTERESIS

PRIORITY

This application relates to and claims the benefit of U.S. Provisional Application 61/736,425 filed on Dec. 12, 2012.

BACKGROUND

Inductive coupling of subsea components most often uses a signaling protocol, such as RS-485, but also uses a data signal carrier. However, carriers and tuned circuits tend to drift and change over temperature and age. Using radio frequency (RF) energy over inductive communication involves using antennae or carriers or the like which are more susceptible to corruption and which also broadcast a louder RF signature. This type of transmission is a type of "far field" communications as opposed to "near field" communications.

Alternatively, subsea components can be coupled using wet-matable connectors that tend to be very expensive and prone to corrosion issues.

FIGURES

Various figures are included herein which illustrate aspects of embodiments of the disclosed inventions.

DESCRIPTION OF EXEMPLARY EMBODIMENTS

The couplers described herein (or "connector sets," as also referenced herein) operate in a "near field" mode, meaning energy, whether used to transmit data or power, is transferred through magnetic induction using a ∂i/∂t circuit (meaning a change in current over a change in time), such as by using inductive transmission and receive coils in which resistors and/or other components such as diodes are placed into series and/or in parallel with the coils and used to control the shape of the pulse, e.g. its voltage and/or frequency. In most embodiments, the circuits operate at a low impedance, which make it more difficult for outside electrical energy to corrupt the data transmission.

The connector sets, as will be apparent to those of ordinary skill in these arts, may be optimized for the actual desired baud rate. Accordingly, the actual baud rate to be effected is variable and tailorable through a wide range of baud rates, and the various connector sets with their respective timing circuits, as described below, work over a range of baud rates. In most contemplated embodiments, timing for 57.6 kilobaud (kb) will allow the various circuits to work from around 38.4 kb to around 115.2 kb or higher, e.g. 10 megabaud, but the connector sets described herein can be used with data transmissions speeds in the range of nearly 0 to around 2.5-10.0 Megahertz (MHz) or higher. Further still, since the energy of the pulse is distributed over a wide frequency range, the pulse comprises a naturally spread spectrum which tends not to give off most energy at one frequency and is very short lived over distance.

The connector sets may be used with many different protocols, such as RS-232 or RS-485, and can be configured to come up in a specific mode such as a receive mode when using, e.g., RS-485, Although typically operative in half duplex at 57.6 kb, the connector sets may also be operative in full duplex mode.

Figure 1:
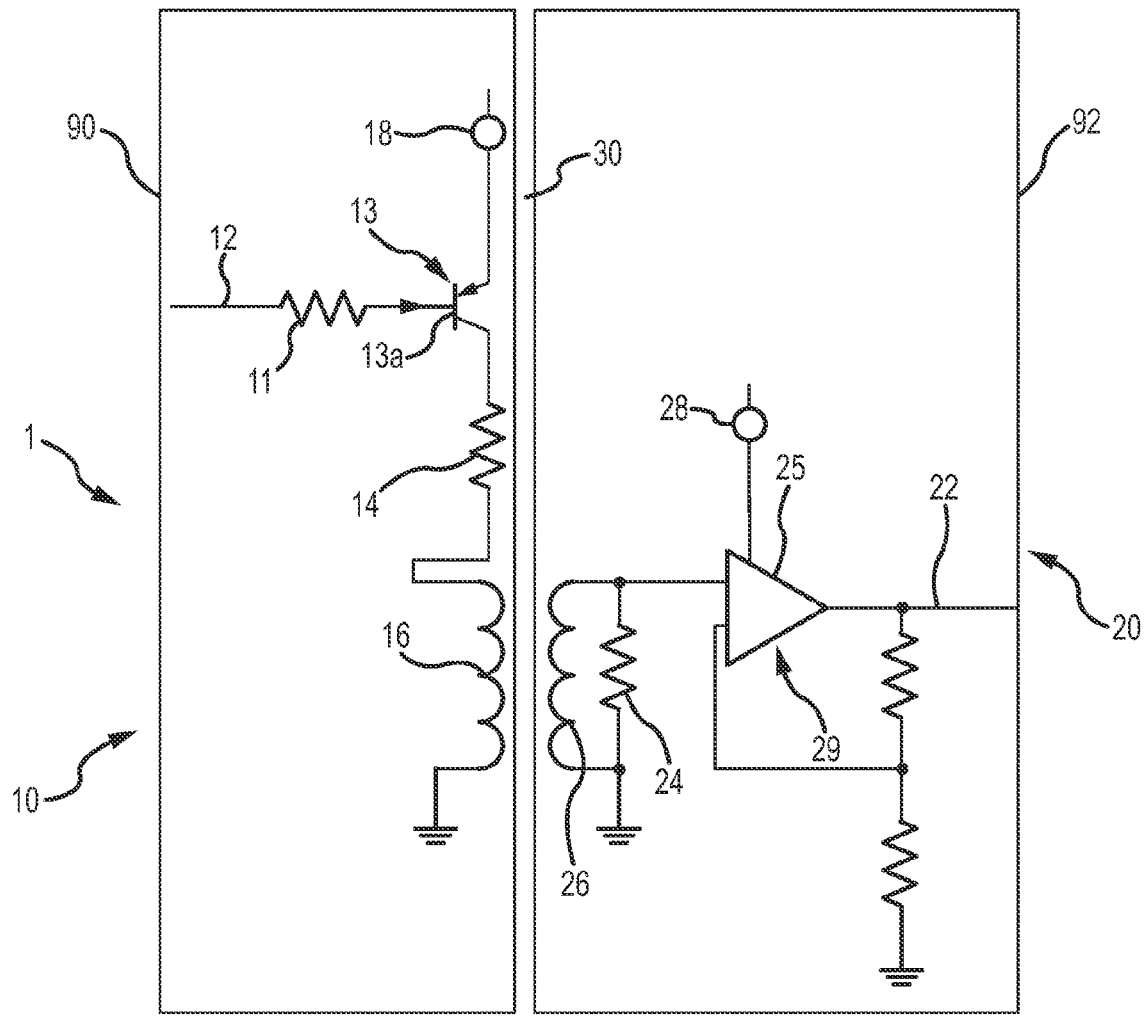
FIG. 1 is a schematic diagram of an exemplary embodiment of a connector set comprising a hysteresis circuit.

Referring now to FIG. 1, non-radio frequency carrier based wireless connector set 1, useful for data transmission especially but not exclusively subsea, comprises first connector 10 and second connector 20. As illustrated in FIG. 1, first connector 10 and second connector 20 are typically housed in separate housings, e.g. housings 90,92.

First connector 10 typically comprises first low impedance transmission path 12 adapted to be used with a data signal operating at a first data transmission speed using a first data protocol; resistor circuit 14 operatively connected to first transmission path 12; first transformer 16 comprising a first inductance and operatively connected to first transmission path 12 at the low impedance; and first direct current voltage source 18 operatively connected to first transformer 16. As will be familiar to those of ordinary skill in the electrical arts, transformers 16,26 typically comprise conductive windings, or coils, wrapped around a core, typically a ferrite core. Further, although resistor circuit 14 is illustrated as a resistor, as described below it can comprise other circuitry, whether passive or active, to achieve various functions as desired by the designer, as will be familiar to those of ordinary skill in electronic circuitry arts.

In further configurations, switch 13 may be operatively connected to first transmission 16 where switch 13 is configured to drive first transformer 16. In certain configurations, switch 13 comprises transistor 13a and can be operatively connected to power source 18. Resistor 11 may be present as well, as those of ordinary skill in the electrical circuitry arts will be recognize.

Second connector 20, which is separated from first connector 10 such as by being housed in a separate housing, e.g. housing 92, is adapted to be disposed in close proximity to first connector 10. This close proximity comprises gap 30 which is preferably a distance of no more than around one-half inch. Second connector 20 typically comprises second low impedance transmission path 22 adapted to be used with a data signal operating at a second data transmission speed using a second data protocol; resistor circuit 24 operatively connected to second transmission path 22; and second transformer 26 operatively connected to second transmission path 22 at a low impedance.

The first data protocol and the second data protocol may comprise the same data transmission protocol, including a serial data transmission protocol such as an RS-485 protocol. Moreover, the data transmission speeds, on either side, may run from near direct current to many megabaud, typically ranging from around 300 baud to around 115.2 kilobaud.

Second transformer 26 comprises a second inductance and is adapted to be inductively and cooperatively coupled to first transformer 16 across gap 30. This second inductance typically comprises a ratio of around three times the first inductance. By way of example and not limitation, the inductance of first transformer 16 may comprise an inductance of around 54 µH and the second inductance of second transformer 26 may comprise an inductance of around 164 µH. In a preferred embodiment, the turns ratio of second transformer 26 is around 1.7 that of first transformer 16. Although the actual numbers are not critical, the ratio is somewhat important as the speed of data transmission is related to the inductance and/or ratio on first transformer 16 and second transformer 26.

Second direct current voltage source 28 is operatively connected to voltage comparator 25. In certain embodiments second direct current voltage source 28 provides an offset voltage of around +1.65VDC. In an embodiment, voltage comparator 25 is operatively connected to second transmission path 22 and typically comprises hysteresis circuit 29 adapted to be centered at a predetermined "no pulse" voltage. Typically, a "no pulse" voltage comprises around +1.5VDC, a "positive pulse" comprises around +1.5VDC, and a "negative pulse" comprises no more than around −1.5VDC. Hysteresis circuit 29 may further be adapted to use between around 2.05VDC to around 1.250VDC.

First connector 10 and second connector 20 may further be adapted to be located remotely using a coax cable (not shown in the figures). In this manner, first transformer 16 may be located remotely from connector housing 90 through the use of a coax cable (not shown in the figures) and second transformer 26 may be located remotely from connector housing 92 through the use of a coax cable.

Figure 2:
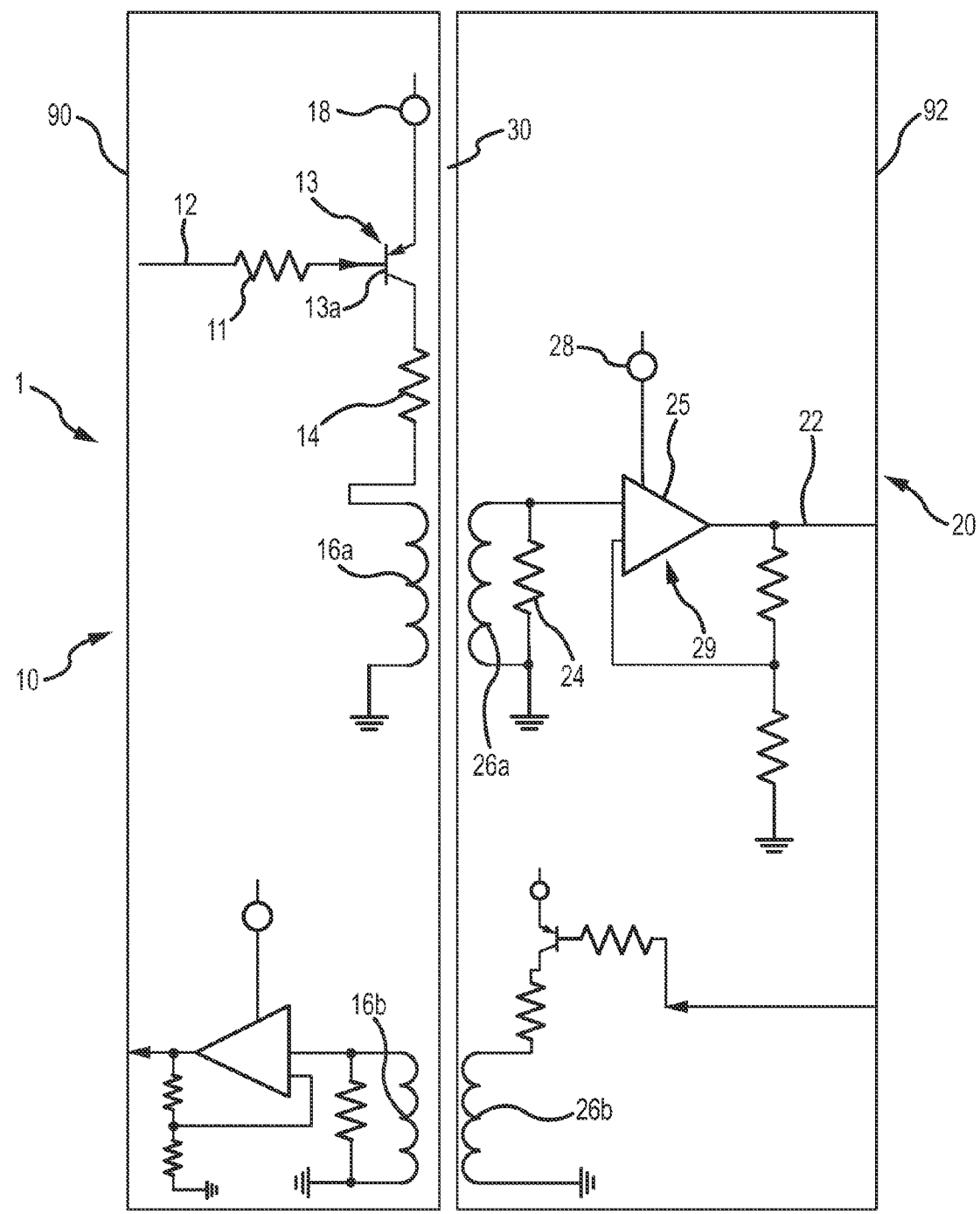
FIG. 2 is a schematic diagram of an exemplary embodiment of a bidirectional data connector set comprising a hysteresis circuit.

Referring additionally to FIG. 2, although data are typically transmitted in half-duplex mode, adding first receive transformer 16b in addition to first transmit transformer 16a and second transmit transformer 26b in addition to second receive transformer 26a, where second receive transformer 26a and second transmit transformer 26b are disposed complementarily to first transmit transformer 16a and first receive transformer 16b, respectively, can allow data to be transmitted in a full-duplex mode between first transformers 16a/16b and second transformers 26a/26b, In certain of these embodiments, first receive transformer 16b may comprise circuitry similar to that described for second receive transformer 26a.

Figure 3:
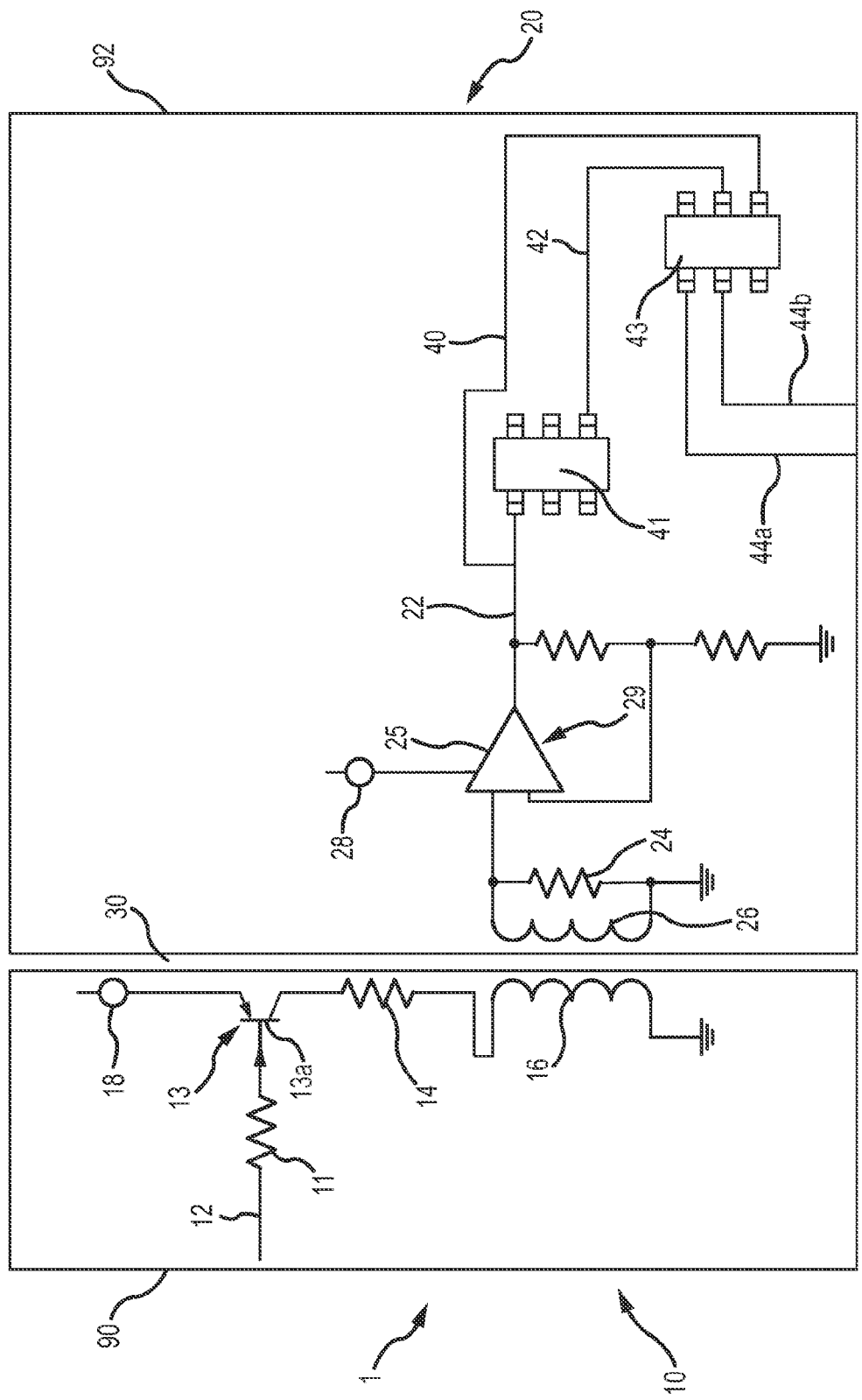
FIG. 3 is a schematic diagram of a further exemplary embodiment of a connector set comprising a hysteresis circuit.

Referring to FIG. 3, in other embodiments, non-radio frequency carrier based wireless connector set 1 further comprises retriggerable vibrator circuit 40, comprising retriggerable vibrator 41 and operatively connected to voltage comparator 25, and transceiver 43, operatively connected to retriggerable vibrator circuit 40. In an exemplary embodiment, outputs of voltage comparator 25 and retriggerable vibrator 41 may be operatively connected to transmit and/or transmit enable pins on transceiver 43. Further, in some embodiments the RS-485 circuit is configured such that if something downstream creates a fault condition, e.g. a constant high or constant low, the RS-485 circuit can go into a fail-safe receive mode so it does not lock up the line upstream. For these RS-485 embodiments, for example, circuits such as retriggerable vibrator circuit 40 can be configured to prevent RS-485 signaling from getting stuck in the transmit mode and thus locking up the data bus, e.g. data transmission paths 12 and/or 22 (FIG. 1).

Figure 4:
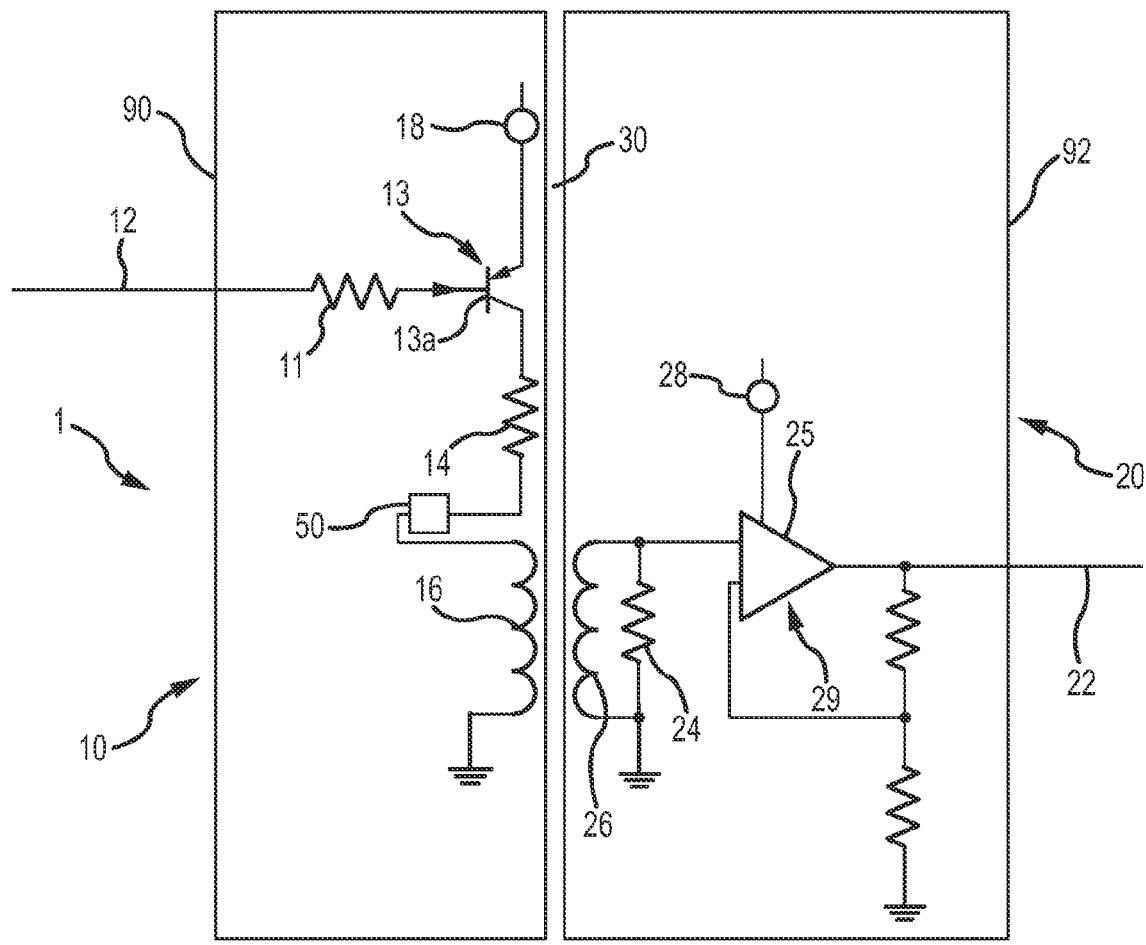
FIG. 4 is a schematic diagram of an exemplary embodiment of a connector set comprising a hysteresis circuit and additional, passive circuitry.

Referring now to FIG. 4, in still further configurations non-radio frequency carrier based wireless connector set 1 further comprises passive circuitry 50 operatively connected to first transformer 16. Passive circuitry 50 is most typically configured to control a predetermined characteristic of the data signal, e.g waveform shape.

Figure 5:
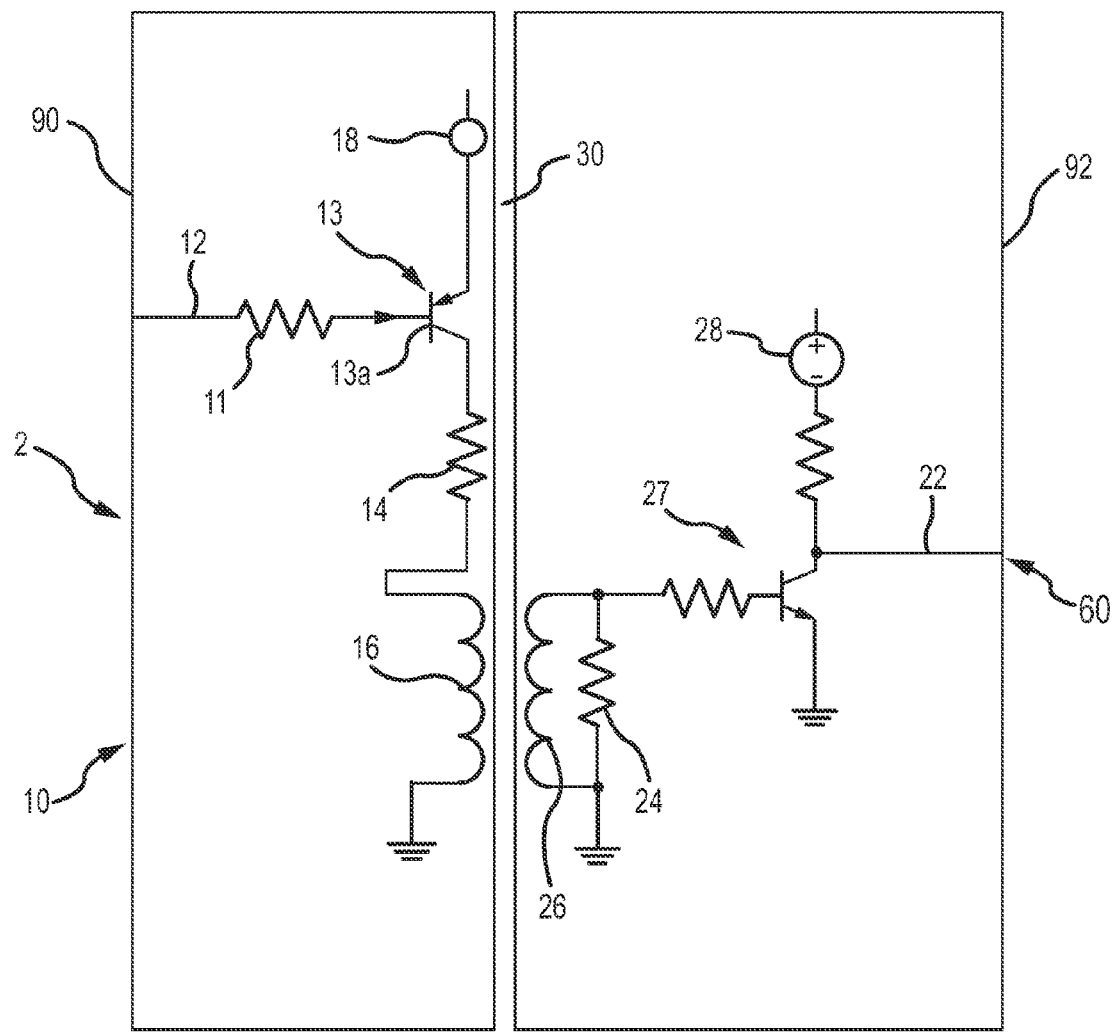
FIG. 5 is a schematic diagram of a further exemplary embodiment of a connector set without a hysteresis circuit.

In further configurations, no voltage hysteresis circuit is required. Referring now to FIG. 5, non-radio frequency carrier based wireless connector set 2, for use in data transmission such as but not exclusively subsea, comprises first connector 10 and second connector 60. First connector 10 is generally as has been described above. Second connector 60 is also generally as has been described above and is adapted to be disposed in close proximity to first connector 10. In this embodiment, however, second conductor 60 comprises second transmission path 22 adapted to be used with a second data protocol operating at a second data transmission speed in a predetermined data transmission mode; timing circuit 24 operatively connected to second transmission path; second transformer 26 comprising a second high inductance substantially equal to the first high inductance and operatively connected to second transmission path 22; second direct current voltage source 28 operatively connected to second transformer 26; and data signal restoration circuit 27. Second transformer 26 is adapted to be inductively and cooperatively coupled to first transformer 16 via a magnetic field. In most other aspects, non-radio frequency carrier based wireless connector set 2 may be configured and operate as does non-radio frequency carrier based wireless connector set 1, but for the absence of hysteresis circuit 29. Further, similar to the description above, non-radio frequency carrier based wireless connector set 2 may be configured and operate in full duplex as well as half duplex modes.

In certain of these embodiments, the inductances of first transform 16 and second transformer 26 may be substantially equal. By way of example and not limitation, the inductance of first transformer 16 may comprise an inductance of at least around 2000 µH and the second inductance of second transformer 26 may comprise an inductance of at least around 2000 µH. Therefore, the inductances need not be low inductances.

Further, as opposed to the other embodiments discussed herein, for non-hysteresis embodiments the pulse used may be a substantially square wave with a substantially zero voltage no pulse value and a peak value of around 3.0VDC.

Figure 6:
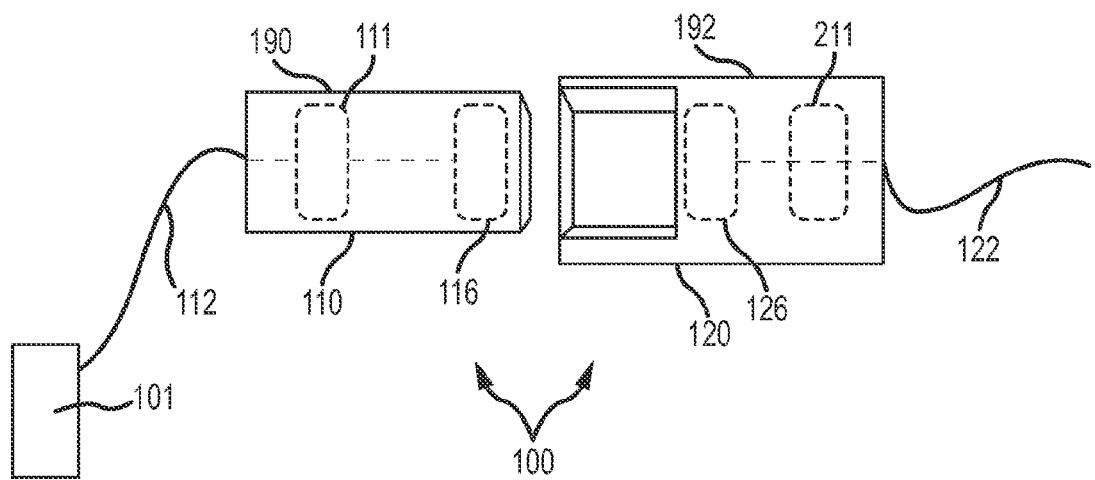
FIG. 6 is a block diagram of an exemplary system comprising a connector set.

Referring now to FIG. 6, an exemplary system for data transmission 100 comprises data transmitter 101 adapted to transmit data using a predetermined data protocol at a first data transmission speed; first connector 110 operatively in communication with data transmitter 101; and second connector 120 which is separated from first connector 110. First connector 110 and second connector 120 may be configured as described above for non-radio frequency carrier based wireless connector set 1 and/or non-radio frequency carrier based wireless connector set 2 with the various connector set components described herein above being disposed at least partially within first housing 190 and second housing 192. Data are transmitted along data pathways 112 and 122 via transformers 116 and 126.

As with the connector sets 1 and 2 described above, system for data transmission 100 may be deployed in an environment comprising air, fresh water, seawater, dark water, sand, mud, grit, oil, vacuum, or the like, or a combination thereof, including but not limited to subsea or space environments. Accordingly, first housing 190 and second housing 192 are typically configured for the deployed environment and comprise materials appropriate to such environment, e.g. materials that are resistant to sea water corrosion and configured for use at a predetermined depth.

In a further exemplary embodiment, system for data transmission 100, or a similar system, may be deployed in a subsea environment which further comprises modular subsea control system 200 adapted for use subsea. For example, in such an environment housing 190 comprises a selectively retrievable transmitter module comprising, e.g., first transformer 116, and housing 192 comprises a module receiver comprising, e.g., second first transformer 126, each adapted for use subsea. Additionally, a source of a control command, such data transmitter 101, may located proximate to or remotely from selectively retrievable module 110 and be operatively in communication with first set of electronics 111 adapted, for example, to issue or otherwise respond to a control signal sent using a first data protocol operating at a first data transmission speed. First transformer 116 may be located a predetermined distance from first set of electronics 111. Module receiver 120 may further comprise second set of electronics 211 disposed at least partially within second housing 192 and adapted to respond to a control signal issued by or through first set of electronics 111.

As will be further understood by those of ordinary skill in the electrical circuitry arts, the control signal, operating at a first data transmission speed of from around 0 hertz to around 2.5-10.0 megahertz or higher, may further comprise a naturally spread spectrum pulse energy pulse configured to result in low radio frequency emissions.

As will also be understood by one of ordinary skill in subsea control arts, first housing 190 and/or second housing 192 may be pressurized and/or pressure compensated, e.g. to a one atmosphere pressure.

Where the data protocol chosen supports it, e.g. RS-485, resistor circuit 14 (FIG. 1) may further comprise logic to determine the existence of a downstream fault and fail safe circuitry adapted to engage in the present of a detected downstream fault, as described above.

Figure 7:
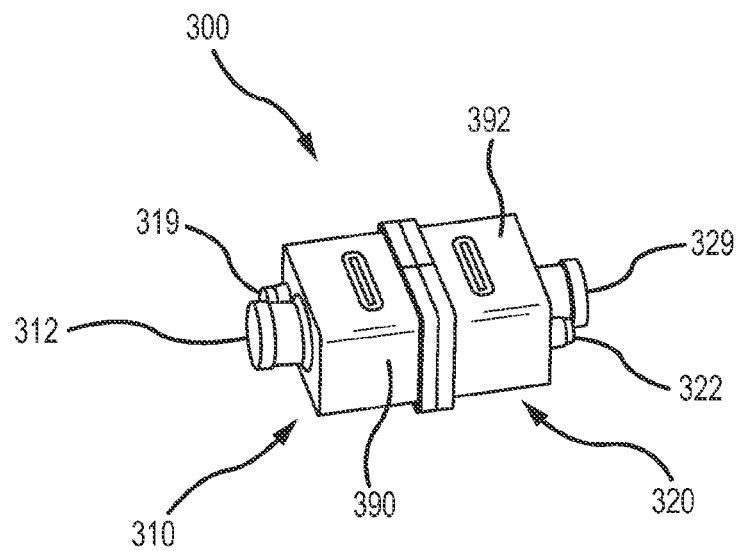
FIG. 7 is a block diagram of an exemplary power connector set.
Figure 8:
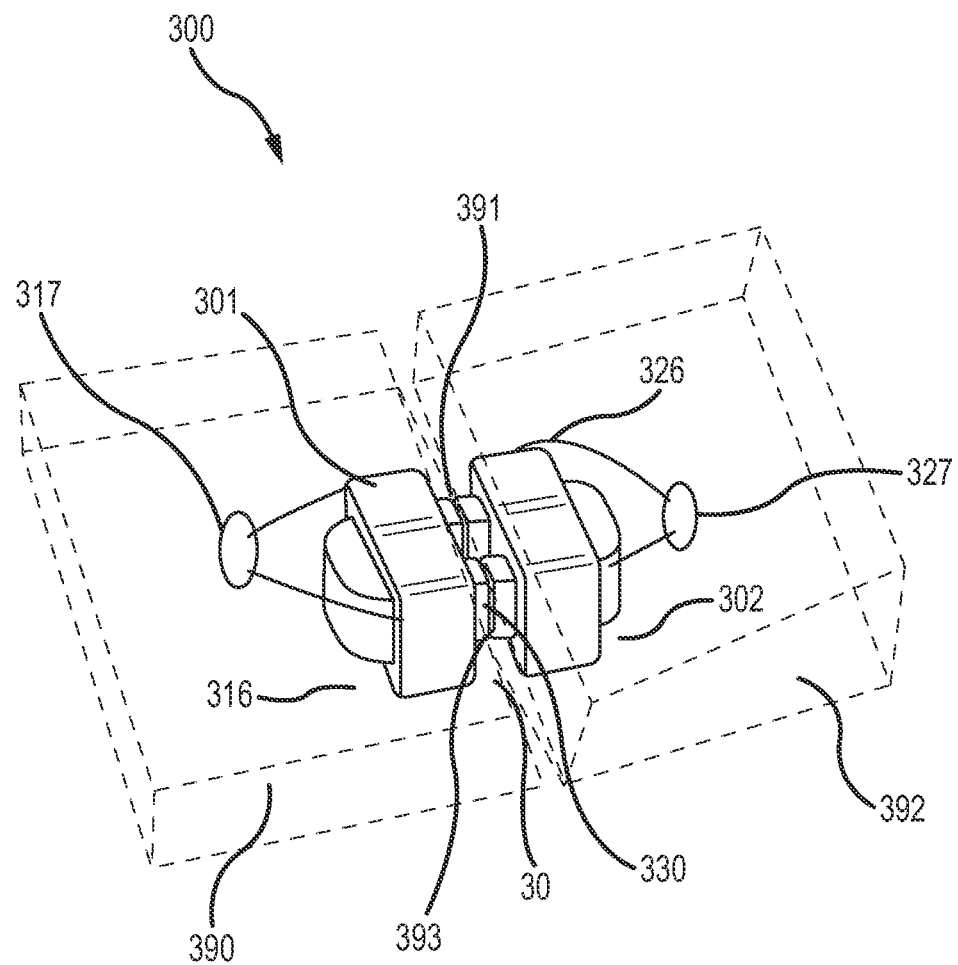
FIG. 8 is a further block diagram in partial perspective cutaway of an exemplary power connector set.

Referring now to FIG. 7, in a still further embodiment, non-radio frequency carrier based wireless connector set 3 is adapted for use in power transmission and comprises first connector 310 and second connector 320. The power signal to be transmitted typically comprises an alternating current power signal. Typically, power transfer using inductive coupling is via alternating current, e.g. a 60 Hz power transfer, but given the configurations of the various embodiments, the number and character of electronics used can minimize failure. Use of a low frequency AC signal can also work to minimize stray fields, as the majority of the generated magnetic field is coupled directly into second transformer 326 (FIG. 8) during operation of non-radio frequency carrier based wireless connector set 3 in a mated condition. Moreover, use of a low operating frequency can also work to minimize the range that any stray fields reach.

First connector 310 may be substantially configured as described herein above, e.g. similar to first connector 10 (FIG. 1), and second connector 320 may be configured substantially as described herein above, e.g. similar to second connector 20 (FIG. 1) or 60 (FIG. 4), where each is configured to be used with a power, rather than a data, signal. Typically, however, each does not include a resistor circuit operatively connected to their respective transformers or direct current voltage sources. Second transformer 320 is further adapted to be inductively and cooperatively coupled to first transformer 310 via a magnetic field and is therefore adapted to be disposed in close proximity to first connector 310. However, secondary voltage may be maintained in view of adjustments in gap 330 (FIG. 8), and, therefore, alignment is typically not critical.

While power transformers with a relatively large air gap will operate over that gap, the efficiency is often quite low and the effective impedance presented to the load is quite high, resulting in poor voltage regulation. In order to address both the power efficiency and the voltage regulation, non-radio frequency carrier based wireless connector set 3 is operated in a tuned near field magnetic resonance mode. This may be achieved by adding capacitors 317 (FIG. 8) and 327 (FIG. 8) in parallel with their respective first transformer 316 and second transformer 326. The values of capacitors 317 and 327 may be chosen so that the resulting inductor-capacitor (LC) tanks are tuned to the operative frequency, e.g. 60 Hz, and/or to shape the wave of the transmitted pulse. In some configurations, the values of capacitors 317 and 327 may be tuned to harmonics of 60 Hz, which can reduce the value, and hence the size, of the required capacitance.

Further, in order to operate in harsh environments, it may be necessary to encase first transformer 316 and second transformer 326 in housings 390 and 392, including mating face 391 of first transformer 326 and mating face 393 of second transformer 326. Other components may also be at least partially encased in housings 390 and 392. Housings 390 and 392 typically comprise corrosion resistant stainless steel, and mating faces 391 and 393 typically comprise a carbon-reinforced polymer. In an embodiment, the polymer is substantially non-conductive, despite the carbon fill, and is around 0.050" thick in the region directly in front of mating faces 391 and 393.

If an area adjacent to where non-radio frequency carrier based wireless connector set 3 is located on an unmanned autonomous underwater vehicle (AUV) (not shown in the figures) is identified as sensitive to low levels of the stray fields, high permeability materials, such as Mu metal, can be added to housing 390 and/or 392 or to an adjacent structure.

In the operation of an exemplary method of data transmission, referring to FIGS. 1 and 2, in embodiments data communications are achieved inductively without a modulation carrier scheme or oscillator, i.e. no radio frequency (RF) carrier, no amplitude shift keying (ASK), no frequency shift keying (FSK), no phase shift keying (PSK), no continuous wave modulation (CW), or the like, Faraday's Law of induction is used to pass the data using a magnetic field.

As described generally above, the first data protocol can comprise a serial data protocol. In those embodiments, either a positive or negative pulse may be generated at first transformer 16 by having a transition of transmitted serial data, from either a logical 0 to a logical 1 or from a local 1 to a logical 0, generate a change in electrical current in first transformer 16 over a period of time and the changing pulse cause a first corresponding change in magnetic flux in first transformer 16 (changing current over changing time ($\partial i/\partial t$)). The resulting generated pulse is either a positive or negative pulse (depending on direction of the serial data logic transition) through first transmit transformer 16 (FIG. 1) to cause a change in magnetic flux to second receiving transformer 26 (FIG. 1). A complementary change in magnetic flux then occurs in second transformer 26.

As described above, in certain embodiments first transmission (TX) transformer 16 (FIG. 1) transmits positive and negative pulses to operatively connected to second transformer 26 which converts the complementary change in flux received by second transformer 26 to the original serial data. Voltage comparator 25 (FIG. 1) may be used to further convert the data signal back into the original serial data wave form. The predetermined data protocol, voltage level, and current level of data transmitted along first transmission path 12 (FIG. 1) and second transmission path 22 (FIG. 2) may be configured to maximize environmental immunity, as understood by those of ordinary skill in these arts.

As noted before, the magnetic pulse resulting from the switching action of the serial data typically generates a baud-independent, naturally occurring spread spectrum pulse. Further, the wide frequency spectrum of the magnetic pulse means that the technology is typically largely immune from stray static magnetic fields (Rare Earth Strong Magnets) and/or electrical storms. Moreover, use of near field technology provides strong immunity from RF signals without affecting RF signals, e.g. wireless, cell phones, walkie-talkies, radar, and the like, or combinations thereof.

By way of example and not limitation, a square wave transition from an RS-485 signal drives transistor 13 (FIG. 1) which in turn drives a voltage across a primary transformer, first transformer 16 (FIG. 1). This voltage transition across first transformer 16 causes a changing current through first transformer 16 (i.e., $\partial i/\partial t$) which, in turn, develops a magnetic flux around first transformer 16. A secondary transformer, such as second transformer 26 (FIG. 1), is disposed in close proximity to first transformer 16 and is sensitive to the magnetic flux which, through the coupling effect, causes an induced voltage on second transformer 26. If first transformer 16 and second transformer 26 are wound with the same polarity, these signals will be in phase with each other. When a primary voltage transition is complete, for example a 0 to 5VDC transition or a 5VDC to 0 transition, $\partial i/\partial t$ goes to zero, magnetic flux goes to zero, and the induced voltage on second transformer 26 goes to zero. Therefore, at each voltage transition on first transformer 16 a voltage pulse is formed on second transformer 26. Where the embodiment comprises voltage comparator 25 (FIG. 1) with hysteresis centered at the "no pulse" voltage (average voltage may be around +1.65 VDC), the original waveform that was driving first transformer 16 can be recovered. Hysteresis circuit 29 (FIG. 1) may be used to help prevent noise from corrupting serial data.

In some embodiments, in order to keep the circuits comprising minimal parts and to not have a negative power supply the average voltage is typically offset from 0VDC to around 1.65VDC (3.3VDC/2). Therefore, in these embodiments positive pulses are at least 1.5VDC and negative pulses are less than or equal to 1.5VDC. For embodiments comprising hysteresis circuit 29 (FIG. 1), hysteresis circuit 29 may be setup at around 2.05VDC and 1.250VDC (with an average of 1.65VDC).

As described above, in certain embodiments two sets of transmit and receive coils exist, allowing data to be sent bi-directionally using half-duplex or full duplex data transmission.

For baseband data transmission, in certain embodiments transmit and receive transformers, e.g. 16 and 26 (FIG. 5) can be wound with much greater inductance, by way of example and not limitation comprising around 2000 µH-3000 µH each. A baseband data signal could comprise a substantially square wave form and be passed from transmit transformer 16 to receive transformer 26. Recovery of the original signal could involve transistor 27 (FIG. 5) or similar circuitry acting to clean up the received square wave. Since transistor 27 generates a 180° degree inverse signal, transformers 16 and 26 could be configured to be out of phase with each other, or, as will be familiar to those of ordinary skill in electronics a second transistor (not shown in the figures) could be placed downstream from transistor 27 to get the signal back in phase.

Referring again to FIG. 3, if used RS-485 retriggerable vibrator circuit 40 keeps secondary transformer 26 (FIG. 3) in receive mode (RX) and does so when the associated circuitry, for example retriggerable vibrator 41 which can be a 74123 logic chip manufactured by various manufacturers, times out. Also, if there is an upstream fault—such as a shorted coil, having a slave side RS-485 bus go bad, or the like or a combination thereof, this circuitry can allow passing one bad message one time, e.g. due to use of an edge trigger, and then go back into RX mode, thus preventing a locking up of the RS-485 master bus. Similarly, upon a fault this also can prevent bombarding of upstream communications, e.g. on an RS-485 master bus, with constant bad messages. Finally, this circuitry can help guarantee that first connector 10 (FIG. 3) will come up in RX mode with respect to second connector 20 (FIG. 3).

Referring again generally to FIG. 6, in certain embodiments data transmission may be accomplished by operatively connecting first connector 110 to data transmitter 101. First connector 110 is operatively coupled to second connector 120, as described herein above, at a separation distance 30 (e.g., FIG. 1) in a predetermined environment. As described above, second connector 120 is adapted to cooperatively receive first connector 110 in close proximity to second connector 120. Separation distance 30 defines a near field communication distance where a magnetic field present at first transformer 116 is at a first predetermined strength and an electrostatic field present at first transformer 116 is at a second predetermined strength. Separation distance 30 typically comprises a distance of no more than around one-half inch or a distance wherein the close proximity of transformers 116, 126 and the low impedance of the magnetic/electronic circuit cause the connectors 110,120 to operate in "near field" communication where the magnetic field is at a predetermined maximum, e.g. a maximum achievable magnetic field strength, and the electrostatic field is at a predetermined minimum, e.g. a minimum achievable electrostatic field strength.

Second transformer 120 may be operatively connected to electronic circuit 211 along second transmission path 122 and data may be sent from data transmitter 110 to electronic circuit 211 through first transformer 116 and second transformer 126 using magnetic fields as described herein above.

In addition to use with data transmission, in embodiments, as discussed above, inductive coupling can be used to provide power transfer in various environments described herein above, including sub-sea applications at depths up to 12000 FSW or more.

Referring still to FIG. 6, separation distance 30 typically comprises a distance of no more than around one-half inch or a distance wherein the close proximity of the TX/RX transformers 116,126 and the low impedance of the magnetic/electronic circuit cause connectors 110 and 120 to operate in "near field" communication where the magnetic field is at a predetermined maximum, e.g. a maximum achievable magnetic field strength, and the electrostatic field is at a predetermined minimum, e.g. a minimum achievable electrostatic field strength.

Due to the soft magnetic nature of the core material, non-radio frequency carrier based wireless connector sets 1 (FIG. 1), 2 (FIG. 2), 100 (FIG. 6), and 300 (FIG. 7) do not have a significant residual field after operation. For example, during normal operation, the AC power field (e.g., for set 300 (FIG. 8)) has a tendency to demagnetize first transformer 316 (FIG. 8) and second transformer 326 (FIG. 8); however, some residual field may be present in first transformer 316 and second transformer 326 after operation. This is a function of the state of the magnetic field when the unit is switched off. Performing a "soft" shutdown rather than an abrupt switching off of the magnetic field can minimize this residual field. Ramping the magnitude of the applied voltage (and resulting magnetic field) down over a number of cycles until it reaches zero will result in a much lower residual field.

Any residual field could be further reduced if needed by using a closeout cover on the AUV (not shown in the figures) that serves to "short" the magnetic poles of the secondary connector, thus confining the field to the core and cover.

Vibration observed with the current coupler may further be minimized and/or mitigated by ensuring that the faces of non-radio frequency carrier based wireless connector sets 1 (FIG. 1), 2 (FIG. 2), 100 (FIG. 6), and 300 (FIG. 7) are fully in contact and slightly preloaded. The attractive forces between them oscillate with the varying power field, e.g. a 60 Hz field, and a preload of a few pounds prevents relative motion of the coupler halves, thereby substantially eliminating any perceived vibration. The vibration transmitted to the AUV (not shown in the figures) could be further reduced by "soft" mounting the secondary side of non-radio frequency carrier based wireless connector sets 1, 2, and/or 300 in a polymer to absorb/dampen remaining vibration.

The foregoing disclosure and description of the inventions are illustrative and explanatory. Various changes in the size, shape, and materials, as well as in the details of the illustrative construction and/or an illustrative method may be made without departing from the spirit of the invention.

What is claimed is:

1. A non-radio frequency carrier based wireless connector set for use in data transmission, comprising:
   a. a first connector, comprising:
      i. a first transmission path adapted to be used with a first data protocol operating at a first data transmission speed in a predetermined data transmission mode;
      ii. a resistor circuit operatively connected to the first transmission path;
      iii. a first transformer operatively connected to the first transmission path, the first transformer comprising a first inductance;
      iv. a first direct current voltage source operatively connected to the first transformer; and
   b. a second connector adapted to be disposed in close proximity to the first connector, comprising:
      i. a second transmission path adapted to be used with a second data protocol operating at a second data transmission speed in a-the predetermined data transmission mode;
      ii. a resistor circuit operatively connected to the second transmission path;
      iii. a second transformer operatively connected to the first transmission path, the second transformer adapted to be inductively and cooperatively coupled to the first transformer, the second transformer comprising a second inductance substantially equal to the first inductance;
      iv. a second direct current voltage source operatively connected to the second transformer; and
      v. a data signal restoration circuit.

2. The non-radio frequency carrier based wireless connector set for use in data transmission of claim 1, wherein the close proximity comprises a distance of no more than around one-half inch.

3. The non-radio frequency carrier based wireless connector set for use in data transmission of claim 1, wherein the first transformer and the second transformer are further adapted to be located remotely using a coax cable.

4. The non-radio frequency carrier based wireless connector set for use in data transmission of claim 1, wherein the first and second inductances are greater than 200 µH.

5. The non-radio frequency carrier based wireless connector set for use in data transmission subsea of claim 4, wherein the first transformer inductance comprises at least around 2000 µH and the second transformer inductance comprises at least around 2000 µH.

6. The non-radio frequency carrier based wireless connector set for use in data transmission of claim 1, wherein the first data protocol and the second data protocol comprise the same data transmission protocol.

7. The non-radio frequency carrier based wireless connector set for use in data transmission of claim 1, wherein the first data protocol and the second data protocol comprise a serial data transmission protocol.

8. The non-radio frequency carrier based wireless connector set for use in data transmission of claim 7, wherein the first data protocol and the second data protocol comprise an RS-485 protocol.

9. The non-radio frequency carrier based wireless connector set for use in data transmission of claim 1, wherein the first data transmission speed and the second data transmission speed range from around 300 baud to around 10 megabaud.

10. The non-radio frequency carrier based wireless connector set for use in data transmission of claim 1, wherein data are transmitted in a half-duplex mode.

11. The non-radio frequency carrier based wireless connector set for use in data transmission of claim 1, wherein:
    a. the first transformer comprises a first transmit coil and a first receive coil;
    b. the second transformer comprises a second transmit coil and a second receive coil, the second transmit coil and the second receive coil disposed complementarily to the first transmit coil and the first receive coil; and
    c. data are transmitted in a full-duplex mode between the first and second transformers.

12. The non-radio frequency carrier based wireless connector set for use in data transmission of claim 1, wherein the data transmission mode comprises use of a square wave, the square wave comprising a no pulse voltage of around 0VDC and a peak voltage of around 3.0VDC.

13. The non-radio frequency carrier based wireless connector set for use in data transmission of claim 1, further comprising:
    a. a retriggerable vibrator operatively connected to the voltage comparator; and
    b. a transceiver operatively connected to the retriggerable vibrator.

14. The non-radio frequency carrier based wireless connector set for use in data transmission of claim 13, further comprising an inverter operatively connected to the retriggerable vibrator and the transceiver intermediate the retriggerable vibrator and the transceiver.

15. The non-radio frequency carrier based wireless connector set for use in data transmission of claim 1, further comprising a switch operatively connected to the first transmission coil, the switch configured to drive the first transformer.

16. The non-radio frequency carrier based wireless connector set for use in data transmission of claim 15, wherein the switch comprises a transistor.

17. The non-radio frequency carrier based wireless connector set for use in data transmission of claim 1, further comprising passive circuitry in communication with the first transformer, the passive circuitry configured to control a predetermined characteristic of the data signal.

18. A system for data transmission, comprising:
a. a data transmitter adapted to transmit data using a predetermined data protocol at a first data transmission speed;
b. a first connector operatively in communication with the data transmitter, the first connector comprising:
   i. a first transmission path adapted to be used with a data signal operating at a first data transmission speed using a first data protocol, the first transmission path comprising a first impedance;
   ii. a first housing;
   iii. a resistor circuit operatively connected to the first transmission path and disposed at least partially within the first housing;
   iv. a first transformer operatively connected to the first transmission path at the first impedance and disposed at least partially within the housing, the first transformer comprising a first inductance;
   v. a first direct current voltage source operatively connected to the first transformer and disposed at least partially within the first housing; and
c. a second connector separate from the first connector, the second connector comprising:
   i. a second transmission path adapted to be used with the data signal operating at a second data transmission speed using a second data protocol, the second transmission path comprising a second impedance;
   ii. a second housing adapted to cooperatively receive the first connector at a first coupled separation distance in close proximity to the first connector in a predetermined environment;
   iii. a resistor circuit operatively connected to the second transmission path and disposed at least partially within the second housing;
   iv. a second transformer operatively connected to the first transmission path at a second impedance and disposed at least partially within the second housing, the second transformer adapted to be inductively and cooperatively coupled to the first transformer, the second transformer comprising a second inductance; and
   v. a second direct current voltage source operatively connected to the second transformer and disposed at least partially within the second housing.

19. The system for data transmission of claim 18, wherein predetermined environment comprises at least one of air, fresh water, seawater, dark water, sand, mud, grit, oil, or vacuum.

20. The system for data transmission of claim 18, wherein the coupled separation distance is no more than around one-half inch.

21. The system for data transmission of claim 18, wherein each of the predetermined data protocol, the first data protocol, and the second data protocol comprises a serial data transmission protocol.

22. The system for data transmission of claim 18, wherein the first housing and the second housing are configured for use subsea.

23. A control system for use subsea, comprising:
a. a selectively retrievable module, comprising:
   i. a first housing adapted for use subsea;
   ii. a first set of electronics disposed at least partially within the first housing, the first set of electronics adapted to issue a control signal using a first data protocol operating at a first data transmission speed; and
   iii. a first connector disposed at least partially within the first housing, the first connector comprising:
      1) a first transmission path adapted to be used with the first data protocol operating at the first data transmission speed, the first transmission path operatively in communication with the first set of electronics, the first transmission path comprising a first impedance;
      2) a resistor circuit operatively connected to the first transmission path and disposed at least partially within the first housing;
      3) a first transformer operatively connected to the first transmission path at the first impedance and disposed at least partially within the first housing, the first transformer comprising a first inductance;
      4) a first direct current voltage source operatively connected to the first transformer and disposed at least partially within the first housing; and
b. a module receiver adapted for use subsea, comprising:
   i. a second housing dimensioned to cooperatively receive the first housing;
   ii. a second set of electronics disposed at least partially within the second housing, the second set of electronics adapted to respond to the first set of electronics' issued control signal; and
   iii. a second connector adapted to be in close proximity to the first connector when the first housing is received into the second housing, the second connector comprising:
      1) a second transmission path adapted to be used with a second data protocol operating at a second data transmission speed, the second transmission path operatively in communication with the second set of electronics, the second transmission path comprising a second impedance;
      2) a resistor circuit operatively connected to the second transmission path and disposed at least partially within the second housing;
      3) a second transformer operatively connected to the second transmission path at the second impedance and disposed at least partially within the second housing, the second transformer adapted to be inductively and cooperatively coupled to the first transformer; and
      4) a second direct current voltage source operatively connected to the second transformer and disposed at least partially within the second housing.

24. The control system for use subsea of claim 23, wherein the control signal further comprises a square wave.

25. The control system for use subsea of claim 23, wherein the first data transmission speed further comprises a frequency of from around 0 hertz to around 10 megahertz.

26. The control system for use subsea of claim 23, wherein the first transformer is located a predetermined distance from the first set of electronics.

27. The control system for use subsea of claim 23, wherein:
a. first data protocol comprises an RS-485 protocol; and
b. the resistor circuit comprises:
   i. an RS-485 timing circuit;
   ii. logic to determine the existence of a downstream fault; and
   iii. a fail-safe circuit adapted to engage in the present of a detected downstream fault.

28. The control system for use subsea of claim 23, further comprising a source of a control command remotely disposed from the selectively retrievable module and operatively in communication with the first set of electronics.

29. A method of data transmission, comprising:
a. operatively connecting a first connector to a data transmitter, the first connector comprising:
   i. a first transmission path adapted to be used with a data signal operating at a first data transmission speed using a first data protocol, the first transmission path comprising a first impedance;
   ii. a resistor circuit operatively connected to the first transmission path;
   iii. a first transformer operatively connected to the first transmission path at the first impedance, the first transformer comprising a first inductance; and
   iv. a first direct current voltage source operatively connected to the first transformer;
b. coupling the first connector to a separate second connector at a separation distance in a predetermined environment, the second connector adapted to cooperatively receive the first connector in close proximity to the second connector, the separation distance defining a near field communication distance where a magnetic field present at the first transformer is at a first predetermined strength and an electrostatic field present at the first transformer is at a second predetermined strength, the second connector comprising:
   i. a second transmission path adapted to be used with a data signal operating at a second data transmission speed using a second data protocol, the second transmission path comprising a second impedance;
   ii. a resistor circuit operatively connected to the second transmission path;
   iii. a second transformer operatively connected to the second transmission path at the second impedance, the second transformer adapted to be inductively and cooperatively coupled to the first transformer, the second transformer comprising a second inductance; and
   iv. a second direct current voltage source operatively connected to the second transformer;
c. operatively connecting the second transformer to an electronic circuit along the second transmission path; and
d. sending data from the data transmitter to the electronic circuit through the first transformer and second transformer.

30. The method of data transmission of claim 29, wherein the separation distance comprises a distance of no more than around one-half inch.

31. The method of data transmission of claim 29, wherein the first predetermined strength comprises a predetermined maximum achievable magnetic field strength.

32. The method of data transmission of claim 30, wherein the second predetermined strength comprises a predetermined minimum achievable electrostatic field strength.

33. The method of data transmission of claim 29, wherein the predetermined data protocol, voltage level, and current level of data transmitted along the first transmission path and the second transmission path are configured to maximize environmental immunity.

34. The method of data transmission of claim 29, wherein the data are passed between the first transformer and the second transformer using Faraday's Law of induction using a magnetic field.

35. The method of data transmission of claim 34, further comprising:
a. selecting the value of the resistor to shape a wave form of the transmitted square wave; and
b. connecting the resistor circuit in parallel to the first transformer.

* * * * *